(12) United States Patent
Kai

(10) Patent No.: US 10,821,962 B2
(45) Date of Patent: Nov. 3, 2020

(54) VEHICLE CONTROL SYSTEM, VEHICLE CONTROL METHOD, AND STORAGE MEDIUM

(71) Applicant: HONDA MOTOR CO., LTD., Minato-ku, Tokyo (JP)

(72) Inventor: Ayaka Kai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 10 days.

(21) Appl. No.: 16/244,198

(22) Filed: Jan. 10, 2019

(65) Prior Publication Data

US 2019/0217849 A1 Jul. 18, 2019

(30) Foreign Application Priority Data

Jan. 15, 2018 (JP) .................................. 2018-004126

(51) Int. Cl.
| | | |
|---|---|---|
| *B60W 20/00* | (2016.01) | |
| *B60W 20/12* | (2016.01) | |
| *B60W 10/06* | (2006.01) | |
| *B60W 10/08* | (2006.01) | |
| *B60K 6/46* | (2007.10) | |
| *G01C 21/34* | (2006.01) | |

(52) U.S. Cl.
CPC ............ *B60W 20/12* (2016.01); *B60W 10/06* (2013.01); *B60W 10/08* (2013.01); *B60K 6/46* (2013.01); *B60W 2400/00* (2013.01); *B60W 2710/0677* (2013.01); *B60W 2710/08* (2013.01); *B60Y 2200/92* (2013.01); *G01C 21/3469* (2013.01)

(58) Field of Classification Search
CPC ...... B60W 20/12; B60W 10/06; B60W 10/08; B60W 2400/00; B60W 2710/0677; B60W 2710/08; B60K 6/46; B60Y 2200/92; G01C 21/3469
See application file for complete search history.

(56) References Cited

U.S. PATENT DOCUMENTS

| | | | | |
|---|---|---|---|---|
| 2014/0088810 | A1* | 3/2014 | Gehring | ................ B60W 10/26 701/22 |
| 2015/0314775 | A1* | 11/2015 | Dextreit | .............. B60W 50/085 701/22 |
| 2016/0137185 | A1* | 5/2016 | Morisaki | ................. B60L 58/13 701/22 |

FOREIGN PATENT DOCUMENTS

JP 2016-088440 5/2016

* cited by examiner

*Primary Examiner* — Hunter B Lonsberry
*Assistant Examiner* — Elizabeth Yang
(74) *Attorney, Agent, or Firm* — Amin, Turocy & Watson, LLP

(57) ABSTRACT

A vehicle control system includes an electric power generator, a battery, a motor for traveling which rotates a driving wheel, a traveling plan generator which generates a traveling plan in which a traveling route has been planned, an electric power generation plan generator which generates an electric power generation plan in which electric power generation by the electric power generator has been planned on the traveling route, and a plan modifier which modifies the electric power generation plan to a plan for increasing the amount of electric power to be generated by the electric power generator in one or more sections before a predetermined section when electric power generation by the electric power generator in the predetermined section having a height equal to or greater than a threshold value among one or more (Continued)

sections constituting the traveling route has been planned in the electric power generation plan.

11 Claims, 8 Drawing Sheets

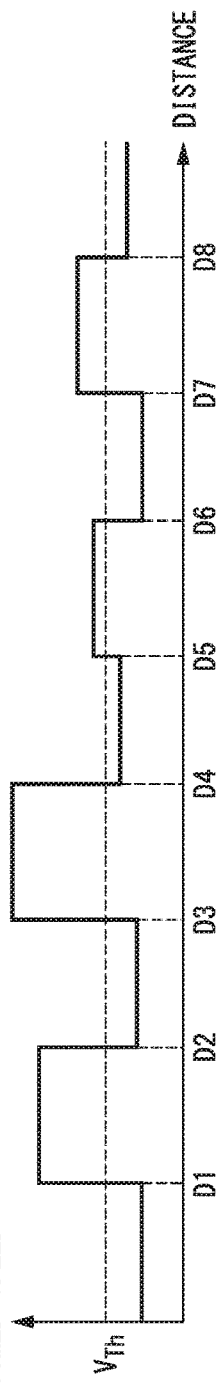
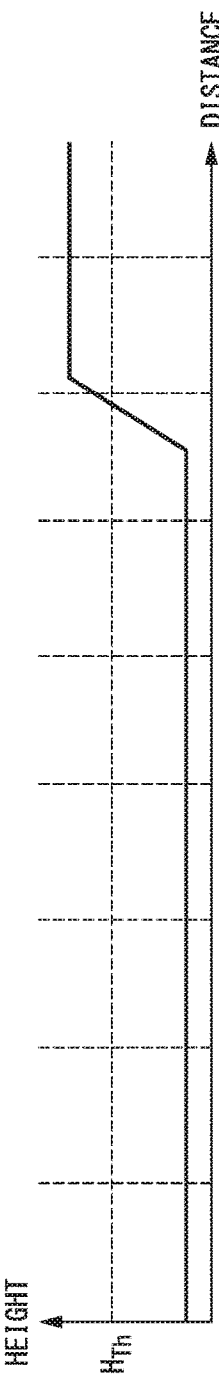
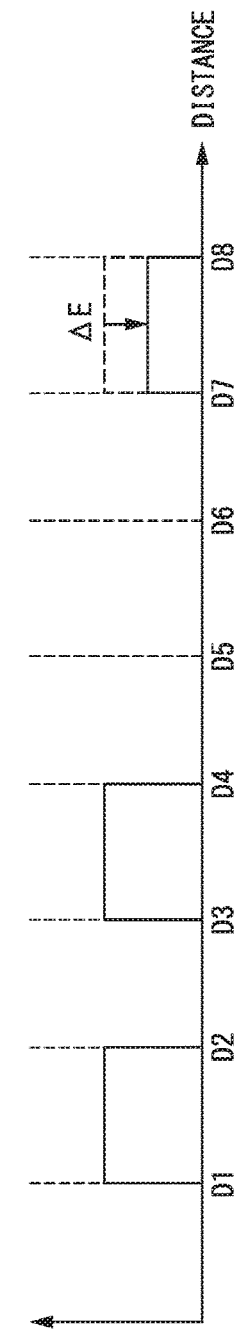
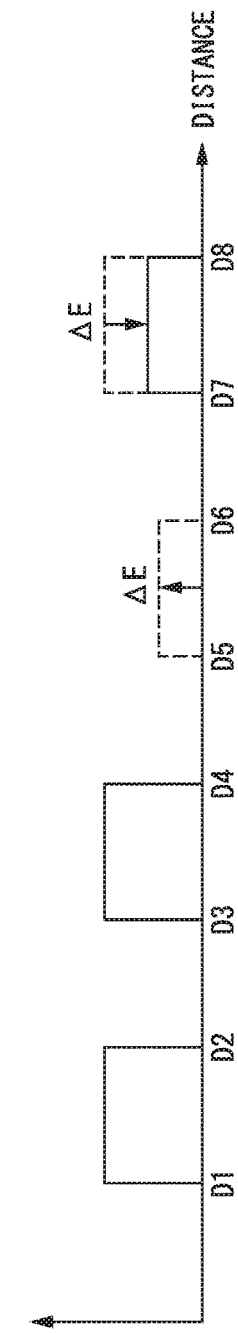
FIG. 10A
FIG. 10B
FIG. 10C
FIG. 10D

VEHICLE CONTROL SYSTEM, VEHICLE CONTROL METHOD, AND STORAGE MEDIUM

CROSS-REFERENCE TO RELATED APPLICATION

This application is based upon and claims the benefit of priority from Japanese Patent Application No. 2018-004126, filed Jan. 15, 2018, the entire contents of which are incorporated herein by reference.

BACKGROUND

Field of the Invention

The present invention relates to a vehicle control system, a vehicle control method, and a storage medium.

Description of Related Art

A technique is known of acquiring traveling route information including altitudes with respect to a traveling route to a destination of a vehicle, setting a motor-assisted traveling section in which the vehicle travels using at least the output of an electric motor according to the altitude of the traveling route and a charged traveling section in which the vehicle travels only with the output of an internal combustion engine and setting a high-altitude place as a motor-assisted traveling section in hybrid vehicles having an internal combustion engine and an electric motor as power sources (refer to Japanese Unexamined Patent Application, First Publication No. 2016-88440, for example).

SUMMARY

However, in the conventional technique, how much electric power for driving the electric motor should be left in a secondary battery in a high-altitude place was not sufficiently examined, and thus there were cases in which vehicles could not continuously travel with stability.

An object of aspects of the present invention devised in view of the aforementioned circumstances is to provide a vehicle control system, a vehicle control method and a storage medium capable of causing vehicles to continuously travel with stability.

The vehicle control system, the vehicle control method and the storage medium according to the present invention employ the following configurations.

One aspect of the present invention is a vehicle control system, including: an electric power generator including an engine which outputs power used by a motor, and the motor which generates electric power using the power output by the engine; a battery which accumulates electric power generated by the electric power generator; a motor for traveling which is connected to a driving wheel of a vehicle and driven using electric power supplied from the battery to rotate the driving wheel; a traveling plan generator which generates a traveling plan in which a traveling route along which the vehicle is caused to travel has been planned; an electric power generation plan generator which generates an electric power generation plan in which electric power generation by the electric power generator has been planned on the traveling route planned according to the traveling plan generated by the traveling plan generator; and a plan modifier which modifies the electric power generation plan to a plan for increasing the amount of electric power to be generated by the electric power generator in one or more sections before a predetermined section when electric power generation by the electric power generator in the predetermined section having a height equal to or greater than a threshold value among one or more sections constituting the traveling route has been planned in the electric power generation plan generated by the electric power generation plan generator.

(2) In an aspect, in the vehicle control system of aspect (1), the plan modifier modifies the electric power generation plan to a plan for causing the electric power generator to generate the amount of electric power based on at least the height of the predetermined section in one or more sections before the predetermined section.

(3) In an aspect, in the vehicle control system of aspect (1) or (2), the plan modifier modifies the electric power generation plan to a plan for increasing the amount of generated electric power of the electric power generator in one or more sections before the predetermined section as the height of the predetermined section increases.

(4) In an aspect, in the vehicle control system of any one of aspects (1) to (3), the plan modifier modifies the electric power generation plan to a plan for increasing the electric power generation time of the electric power generator when electric power generation by the electric power generator in the predetermined section has been planned (5) In an aspect, in the vehicle control system of any one of aspects (1) to (4), the plan modifier modifies the electric power generation plan to a plan for increasing the amount of generated electric power per unit time of the electric power generator when electric power generation by the electric power generator in the predetermined section has been planned.

(6) In an aspect, in the vehicle control system of any one of aspects (1) to (5), the plan modifier modifies a section in which electric power generation by the electric power generator has not been planned among one or more sections before the predetermined section to a section in which the electric power generator is caused to generate electric power when electric power generation by the electric power generator in the predetermined section has been planned.

(7) In an aspect, in the vehicle control system of any one of aspects (1) to (6), the electric power generation plan generator generates the electric power generation plan for increasing the amount of generated electric power of the electric power generator in a section in which the speed of the vehicle increases among one or more sections constituting the traveling route.

(8) Another aspect of the present invention is a vehicle control method in which a computer mounted in a vehicle including: an electric power generator including an engine which outputs power used by a motor, and the motor which generates electric power using the power output by the engine; a battery which accumulates electric power generated by the electric power generator; and a motor for traveling which is connected to a driving wheel of a vehicle and driven using electric power supplied from the battery to rotate the driving wheel generates a traveling plan in which a traveling route along which the vehicle is caused to travel has been planned, generates an electric power generation plan in which electric power generation by the electric power generator has been planned on the traveling route planned according to the traveling plan generated by the traveling plan generator, and modifies the electric power generation plan to a plan for increasing the amount of electric power to be generated by the electric power generator in one or more sections before a predetermined section when electric power generation by the electric power generator in the predetermined section having a height equal to or greater than a threshold value among one or more sections constituting the traveling route has been planned in the generated electric power generation plan.

(9) Another aspect of the present invention is a computer-readable non-transitory storage medium storing a program for causing a computer mounted in a vehicle including: an electric power generator including an engine which outputs power used by a motor, and the motor which generates electric power using the power output by the engine; a battery which accumulates electric power generated by the electric power generator; and a motor for traveling which is connected to a driving wheel of a vehicle and driven using electric power supplied from the battery to rotate the driving wheel to perform: a process of generating a traveling plan in which a traveling route along which the vehicle is caused to travel has been planned; a process of generating an electric power generation plan in which electric power generation by the electric power generator has been planned on the traveling route planned according to the traveling plan generated by the traveling plan generator; and a process of modifying the electric power generation plan to a plan for increasing the amount of electric power to be generated by the electric power generator in one or more sections before a predetermined section when electric power generation by the electric power generator in the predetermined section having a height equal to or greater than a threshold value among one or more sections constituting the traveling route has been planned in the generated electric power generation plan.

According to any of aspects (1) to (9), vehicles can continuously travel with stability.

BRIEF DESCRIPTION OF THE DRAWINGS

FIG. 10A is a diagram explaining another example of the method for modifying an electric power generation plan.

FIG. 10B is a diagram explaining another example of the method for modifying an electric power generation plan.

FIG. 10C is a diagram explaining another example of the method for modifying an electric power generation plan.

FIG. 10D is a diagram explaining another example of the method for modifying an electric power generation plan.

DESCRIPTION OF EMBODIMENTS

Hereinafter, embodiments of a vehicle control system, a vehicle control method and a storage medium of the present invention will be described with reference to the drawings.
<First Embodiment>
[Overall Configuration]

Figure 1:
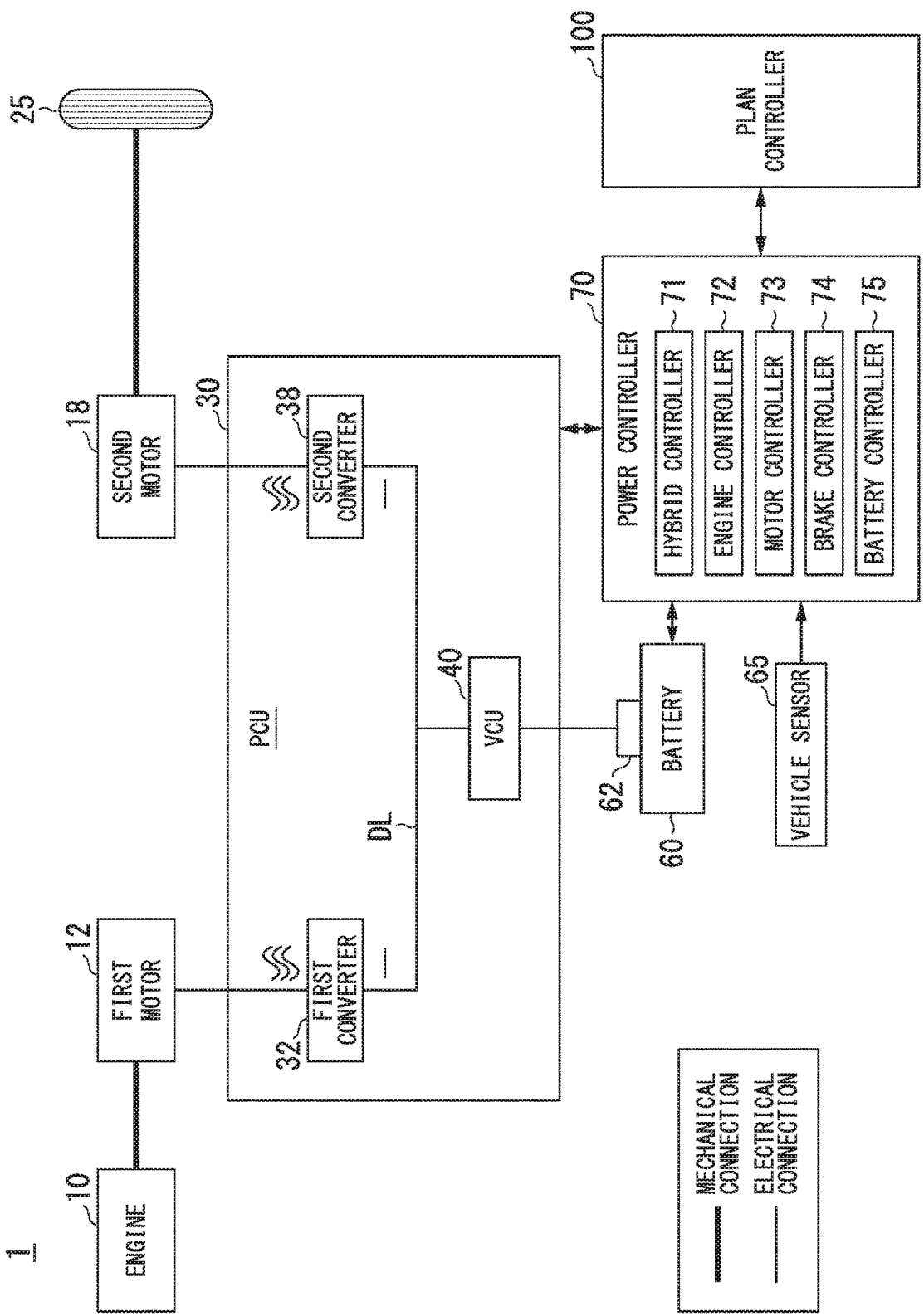
FIG. 1 is a diagram showing an example of a configuration of a vehicle equipped with a vehicle system.

FIG. 1 is a diagram showing an example of a configuration of a vehicle equipped with a vehicle system 1. For example, the vehicle equipped with the vehicle system 1 is a two-wheeled, three-wheeled, or four-wheeled vehicle or the like, and a driving source thereof is an internal combustion engine such as a diesel engine or a gasoline engine, a motor, or a combination thereof. When the vehicle includes a motor, the motor operates using electric power generated by a motor for electric power generation connected to an internal combustion engine, or discharged electric power of a secondary battery or a fuel cell. In the following description, a hybrid vehicle employing a series type will be described as an example. The series type is a type in which an engine is not mechanically connected to driving wheels, power of the engine is used for electric power generation performed by a motor for power generation and generated electric power is supplied to a motor for traveling. The vehicle equipped with the vehicle system 1 may be a vehicle which is able to plug-in charge a battery.

As shown in FIG. 1, the vehicle is equipped with an engine 10, a first motor (motor for electric power generation) 12, a second motor (motor for traveling) 18, a driving wheel 25, a power control unit (PCU) 30, a battery (storage battery) 60, a vehicle sensor 65, a power controller 70, and a plan controller 100. A combination of the engine 10 and the first motor 12 is an example of an "electric power generator."

The engine 10 is an internal combustion engine which outputs power by burning a fuel such as gasoline. For example, the engine 10 is a reciprocating engine including a cylinder, a piston, an intake valve, an exhaust valve, a fuel injection apparatus, an ignition plug, a connecting rod, a crank shaft, etc. The engine 10 may be a rotary engine. The power that can be output by the engine 10 is less than the power necessary to generate the amount of electric power used for the first motor 12 to drive the second motor 18 in real time (or the amount of electric power that causes the vehicle to travel at a predetermined speed or higher). That is, the power of the engine 10 is less than the power of the first motor 12. The engine 10 is small and light and thus has an advantage of a high degree of freedom in an onboard layout.

For example, the first motor 12 is a three-phase AC motor. The first motor 12 has a rotor connected to an output shaft (e.g., crank shaft) of the engine 10 and generates electric power using power output by the engine 10. The first motor 12 is mainly used for electric power generation.

For example, the second motor 18 is a three-phase AC motor. A rotor of the second motor 18 is connected to the driving wheel 25. The second motor 18 outputs power to the driving wheel 25 using supplied electric power. The second motor 18 generates electric power using the kinetic energy of the vehicle when the vehicle decelerates. Hereinafter, there are cases in which the electric power generation operation performed by the second motor 18 is referred to as regeneration. The second motor 18 performs driving and regeneration of the vehicle.

The PCU 30 includes a first converter 32, a second converter 38 and a voltage control unit (VCU) 40, for example. A configuration in which these components are integrated into the PCU 30 is merely an example and these components may be arranged in a distributed manner.

The first converter 32 and the second converter 38 are AC-DC converters, for example. DC terminals of the first converter 32 and the second converter 38 are connected to a DC link DL. The battery 60 is connected to the DC link DL through the VCU 40. The first converter 32 converts the AC generated by the first motor 12 into DC and outputs the DC to the DC link DL or converts the DC supplied through the DC link DL into AC and supplies the AC to the first motor 12. In the same manner, the second converter 38 converts the AC generated by the second motor 18 into DC and outputs the DC to the DC link DL or converts the DC supplied through the DC link DL into AC and supplies the AC to the second motor 18.

The VCU 40 is a DC-DC converter, for example. The VCU 40 boosts electric power supplied from the battery 60 and outputs the boosted electric power to the DC link DL.

For example, the battery 60 is a secondary battery such as a lithium-ion battery.

The power controller 70 includes a hybrid controller 71, an engine controller 72, a motor controller 73, a brake controller 74 and a battery controller 75, for example. The hybrid controller 71 outputs instructions to the engine controller 72, the motor controller 73, the brake controller 74 and the battery controller 75. Instructions output by the hybrid controller 71 will be described later.

The engine controller 72 performs ignition control, throttle opening control, fuel injection control, fuel cut control and the like of the engine 10 according to instructions from the hybrid controller 71. The engine controller 72 may calculate an engine RPM on the basis of an output of a crank angle sensor attached to the crank shaft and output a signal based on the calculated engine RPM to the hybrid controller 71.

The motor controller 73 performs switching control of the first converter 32 and/or the second converter 38 according to instructions from the hybrid controller 71.

The brake controller 74 controls a brake device (not shown) according to instructions from the hybrid controller 71. The brake device is a device which outputs a brake torque generated according to a brake operation (e.g., stepping on a brake pedal) of a driver to the driving wheel or the like, for example.

The battery controller 75 calculates the amount of electric power (e.g., state of charge) of the battery 60 on the basis of an output of a battery sensor 62 attached to the battery 60 and outputs a signal based on the calculated amount of electric power of the battery 60 to the hybrid controller 71.

The vehicle sensor 65 includes an accelerator position sensor, a vehicle speed sensor, a brake stepping amount sensor and the like, for example. The accelerator position sensor is attached to an accelerator pedal, which is an example of an operator that receives an acceleration instruction from a driver. The accelerator position sensor detects an operation amount of the accelerator pedal and outputs a signal representing the detected operation amount to the power controller 70 as an accelerator position. The vehicle speed sensor includes a wheel speed sensor attached to each wheel and a speed calculator, for example. The speed calculator integrates wheel speeds detected by the wheel speed sensors of respective wheels and derives the integrated wheel speed as a speed of the vehicle (vehicle speed). The vehicle speed sensor outputs a signal representing the speed of the vehicle derived by the speed calculator to the power controller 70. The brake stepping amount sensor is attached to a brake pedal, which is an example of an operator that receives a deceleration or stopping instruction from the driver. The brake stepping amount sensor detects an operation amount of the brake pedal and outputs a signal representing the detected operation amount to the power controller 70 as a brake stepping amount.

Here, control performed by the hybrid controller 71 is described. The hybrid controller 71 derives a driving shaft-requested torque Td on the basis of an accelerator position and a target vehicle speed first and determines a driving shaft-requested power Pd output by the second motor 18. The hybrid controller 71 determines whether to operate the engine 10 on the basis of the determined driving shaft-requested power Pd, electric power consumption of accessories and the amount of electric power of the battery 60, etc., and when it is determined that the engine 10 is operated, determines an engine power Pe that needs to be output by the engine 10.

The hybrid controller 71 determines a reaction torque of the first motor 12 such that the reaction torque matches the engine power Pe on the basis of the determined engine power Pe. The hybrid controller 71 outputs information on various determined parameters to the engine controller 72. When the driver operates the brake, the hybrid controller 71 determines distribution of a brake torque that can be output through regeneration of the second motor 18 and a brake torque to be output by the brake device and controls the motor controller 73 and the brake controller 74 according to determined distribution.

[Functional Configuration of Plan Controller]

Figure 2:
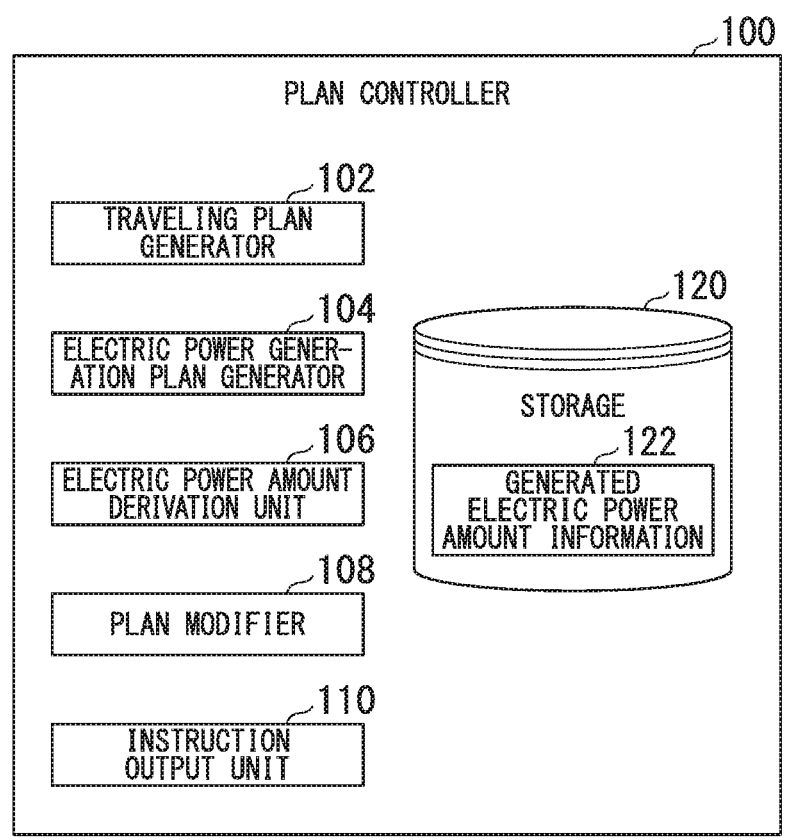
FIG. 2 is a diagram showing an example of a functional configuration of a plan controller.

FIG. 2 is a diagram showing an example of a functional configuration of the plan controller 100. For example, the plan controller 100 includes a traveling plan generator 102, an electric power generation plan generator 104, an electric power amount derivation unit 106, a plan modifier 108, a command output unit 110 and a storage 120.

The traveling plan generator 102, the electric power generation plan generator 104, the electric power amount derivation unit 106, the plan modifier 108 and the command output unit 110 are realized by executing programs (software) through a processor such as a central processing unit (CPU) or a graphics processing unit (GPU), for example. Some or all of these components may be realized using hardware (circuit unit including circuitry) such as a large-scale integration (LSI) device, an application-specific integrated circuit (ASIC) and a field-programmable gate array (FPGA) or realized by cooperation between software and hardware. Programs may be stored in advance in storage devices such as a hard disk drive (HDD) and a flash memory or stored in a detachable storage medium such as a DVD or a CD-ROM and installed in the storage 120 when the storage medium is set in a drive device.

For example, the storage 120 is realized by a storage device such as a read-only memory (ROM), an electrically-erasable and programmable read-only memory (EEPROM), a hard disk drive (HDD), a random-access memory (RAM) or a register. The storage 120 stores generated electric power amount information 122 which will be described later, a processing result of each component, and the like in addition to programs referred to by the processor.

Figure 3:
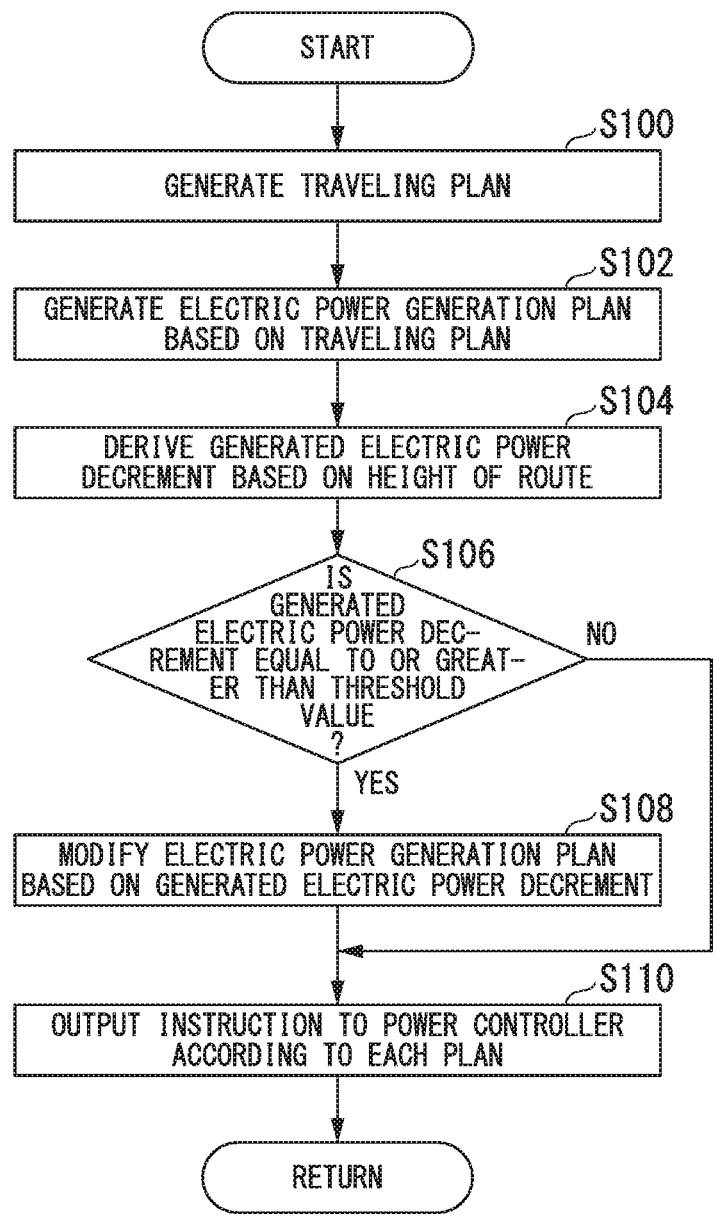
FIG. 3 is a flowchart showing an example of a processing flow executed by the plan controller.

Hereinafter, a process of each component of the plan controller 100 will be described on the basis of a flowchart. FIG. 3 is a flowchart showing an example of a processing flow executed by the plan controller 100. The process of this flowchart may be repeatedly performed in a predetermined period, for example.

First, the traveling plan generator 102 generates a traveling plan that plans a traveling route through which the vehicle is caused to travel, and the like (step S100). For example, the traveling plan generator 102 determines a route from a current position of the vehicle or an arbitrary position set by an occupant of the vehicle (e.g., home and the like) to a point determined as a destination as a traveling route. The destination may be set by the occupant operating a navigation device (not shown), for example.

The traveling plan may include various types of information such as the height (altitude or elevation) of the traveling route, an arrival time at the destination designated by the occupant, information on road traffic jams, a recommended speed to be output by the vehicle, a route designated by the occupant such that the vehicle is preferentially caused to travel therealong and road types of the route in addition to the traveling route. For example, the traveling plan is displayed as an image on a screen of the navigation device, or the like. In this case, the occupant drives the vehicle according to the traveling plan displayed on the screen of the navigation device, for example. The vehicle of the present embodiment is not limited to vehicles manually driven by occupants and may be an automatic drive vehicle whose steering, acceleration and deceleration are automatically controlled on the basis of a traveling plan and surrounding situations of the vehicle.

Figure 4:
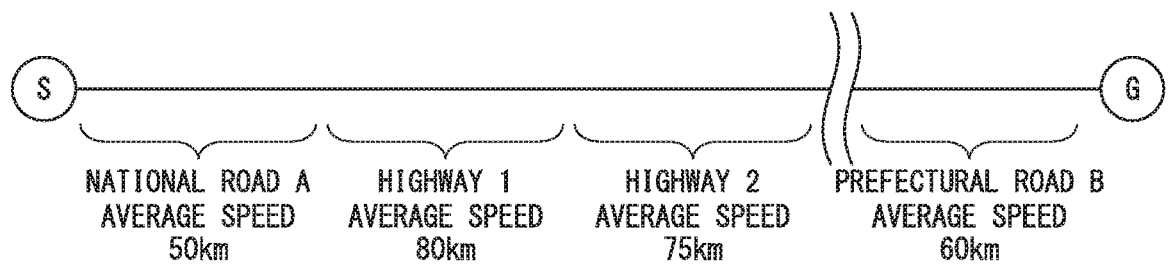
FIG. 4 is a diagram showing an example of a traveling plan.

FIG. 4 is a diagram showing an example of a traveling plan. For example, a traveling plan including a traveling route from a place of departure S to a destination G may be information in which traveling speeds recommended or to be observed, such as "average speed of 50 km," "average speed of 80 km," "average speed of 75 km" and "average speed of 60 km," have been planned for each of sections such as "national road A," "highway 1," "highway 2" and "prefectural road B," as shown. For example, the traveling plan generator 102 may determine such traveling speeds on the basis of a legal speed limit and a degree of congestion (presence or absence of a traffic jam, and the like) of each section.

Next, the electric power generation plan generator 104 generates an electric power generation plan that plans an electric power amount to be generated by the first motor 12, an electric power generation time, and the like in the traveling route included in the traveling plan generated by the traveling plan generator 102 (step S102).

For example, the electric power generation plan generator 104 generates an electric power generation plan such that an electric power amount (hereinafter referred to as an electric power generation requested electric power amount) which is a difference between the current amount of charge of the battery 60 and a power consumption amount predicted to be consumed until the vehicle arrives at the destination is generated during traveling along the traveling route on the assumption that the vehicle travels along the traveling route included in the traveling plan as planned. Here, the electric power generation plan generator 104 generates an electric power generation plan which decreases a degree of influence on the occupant in the vehicle and the surrounding environment of the vehicle when the first motor 12 has been caused to generate electric power. For example, "influence" refers to the driver feeling uncomfortable due to noise from the engine 10 and the first motor 12 generated during electric power generation. For example, the electric power generation plan generator 104 generates an electric power generation plan for causing the first motor 12 to generate electric power such that engine noise does not make the driver feel uncomfortable during electric power generation.

More specifically, the electric power generation plan generator 104 generates an electric power generation plan for preferentially causing the first motor 12 to generate electric power in a section in which the vehicle can travel at a speed equal to or higher than a threshold value $V_{Th}$ among one or more sections constituting the traveling route. That is, the electric power generation plan generator 104 determines a section in which the vehicle can travel at a speed at which noise generated when the first motor 12 generates electric power is masked by frictional sound or wind noise generated when the vehicle travels as an electric power generation section of the first motor 12. For example, when the threshold value $V_{Th}$ is 65 [km/h], the section of "highway 1" and "highway 2" are preferentially determined as electric power generation sections in the above-described example of FIG. 4.

The electric power generation plan generator 104 may determine a section having a large number of neighboring vehicles (section having heavy traffic) as an electric power generation section of the first motor 12. Accordingly, noise generated when the first motor 12 generates electric power is easily masked by noise of neighboring vehicles.

Subsequently, the electric power amount derivation unit 106 derives a decrement ΔE which is an estimate for a decrease in a generated electric power amount of the first motor 12 planned for each section as an electric power generation section on the basis of the height of the traveling route included in the traveling plan (step S104). Since an atmospheric oxygen concentration decreases as the height increases when a vehicle travels, in general, the efficiency of the engine 10 easily deteriorates. As a result, power output by the engine 10 decreases and thus the electric power amount generated by the first motor 12 is reduced. It is assumed that a function, a map, a table or the like which represents such a relationship between heights and amounts of generated electric power (or electric power generation efficiency and the like) is stored in advance in the storage 120 as the generated electric power amount information 122. A function, a map or a table representing a relationship between oxygen concentrations and amounts of generated electric power and a function, a map or a table representing a relationship between heights and oxygen concentrations may be stored in advance in the storage 120 as the generated electric power amount information 122.

Figure 5:
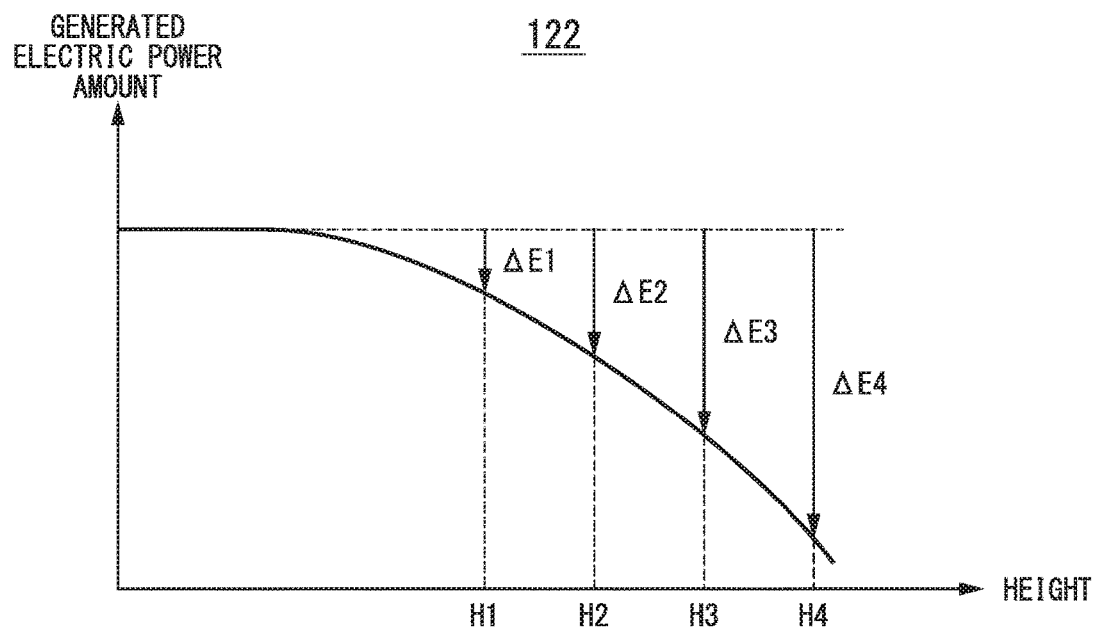
FIG. 5 is a diagram showing an example of generated electric power amount information.

FIG. 5 is a diagram showing an example of the generated electric power amount information 122. As shown in the example of the figure, the generated electric power amount information 122 may be a map representing changes in the amount of generated electric power according to height. For example, the electric power amount derivation unit 106 derives the decrement ΔE of the amount of generated electric power of the first motor 12 for each section of the traveling route with reference to such a map. For example, a decrement of the amount of generated electric power is derived as ΔE1 in a section having a height H1 and a decrement of the amount of generated electric power is derived as ΔE2 greater than ΔE1 in a section having a height H2. In this manner, the amount of generated electric power decreases more easily in a section having a greater height. It is assumed that power output by the engine 10 is constant in the illustrated example.

Subsequently, the plan modifier 108 determines whether the decrement ΔE of the amount of generated electric power of the first motor 12 which is derived by the electric power amount derivation unit 106 for each section of the traveling route is equal to or greater than a threshold value (step S106), and when it is determined that the decrement ΔE is equal to or greater than the threshold value, that is, when the height is equal to or greater than a predetermined height $H_{Th}$, modifies the electric power generation plan on the basis of the decrement $\Delta E$ (step S108).

Figure 6A:
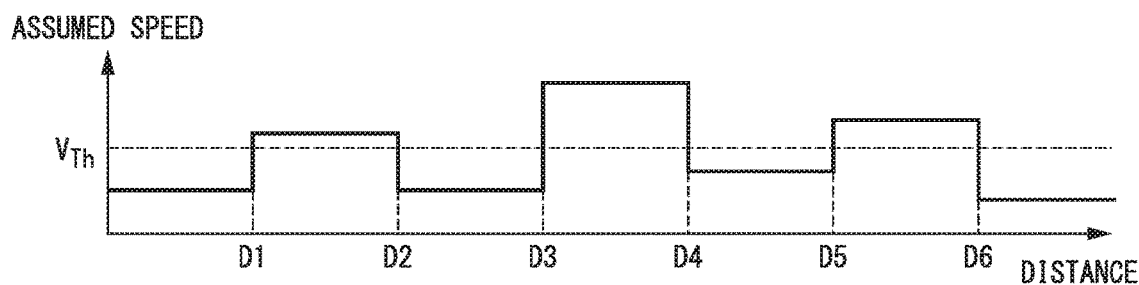
FIG. 6A is a diagram explaining an example of a method for modifying an electric power generation plan.
Figure 6B:
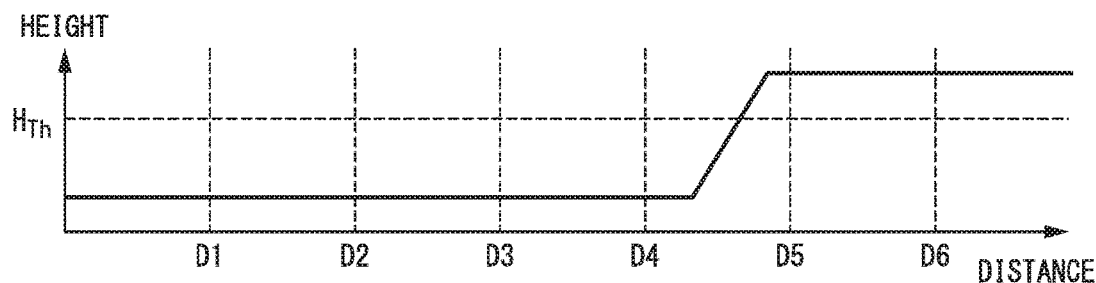
FIG. 6B is a diagram explaining an example of the method for modifying an electric power generation plan.
Figure 6C:
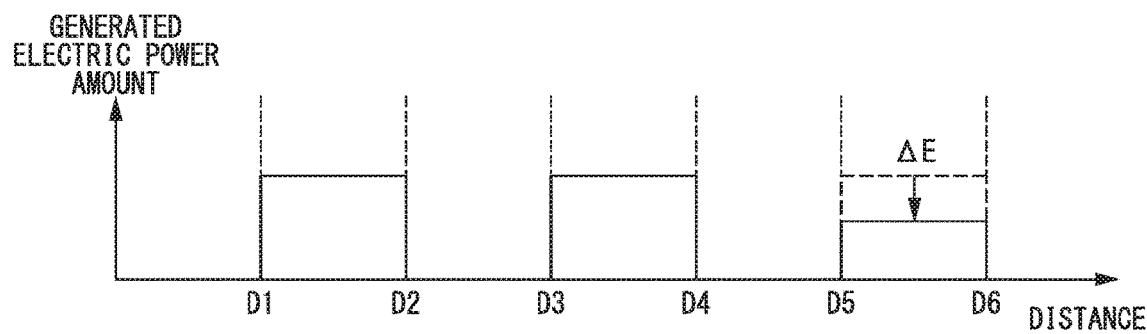
FIG. 6C is a diagram explaining an example of the method for modifying an electric power generation plan.
Figure 6D:
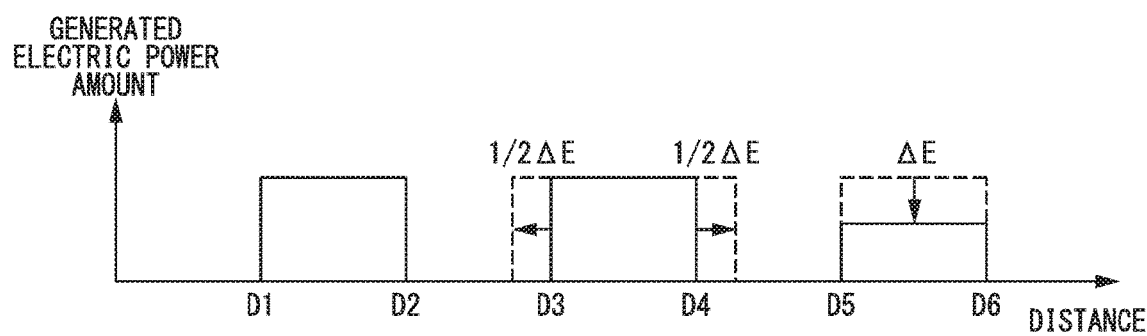
FIG. 6D is a diagram explaining an example of the method for modifying an electric power generation plan.

FIG. 6A to FIG. 6D are diagrams explaining examples of a method for modifying an electric power generation plan. As illustrated in FIG. 6A, in a section (hereinafter, a D1-D2 section) from a certain point D1 to a certain point D2, a section (hereinafter, a D3-D4 section) from a certain point D3 to a certain point D4 and a section (hereinafter, a D5-D6 section) from a certain point D5 to a certain point D6, a speed of a vehicle when the vehicle travels in these sections is assumed to be equal to or higher than a threshold value $V_{Th}$, and thus these three sections are set to electric power generation sections of the first motor 12 in an electric power generation plan. On the other hand, the section from D4 to D5 is followed by a section (hereinafter referred to as a high-height section) in which the altitude is equal to or greater than a threshold value $H_{Th}$, as illustrated in FIG. 6B. Accordingly, the amount of generated electric power decreases by $\Delta E$ in a D5-D6, section which is a high-height section, as shown in FIG. 6C. In such a case, the plan modifier 108 modifies the electric power generation plan such that electric power corresponding to the decrement $\Delta E$ of the amount of generated electric power in the D5-D6 section is generated in the D1-D2 section or the D3-D4 section. For example, the plan modifier 108 modifies the electric power generation plan to a plan for increasing the electric power generation time of the first motor 12 in the D3-D4 section right before the D5-D6 section between two sections set to electric power generation sections (sections in which a speed that can be output by the vehicle is equal to or higher than the threshold value $V_{Th}$) in order to further generate electric power corresponding to the decrement $\Delta E$, as illustrated in FIG. 6D. Accordingly, it is possible to predict that the amount of generated electric power of the first motor 12 decreases when the vehicle travels in a high-height section and to generate a larger amount of electric power before the vehicle arrives at the high-height section. Consequently, it is possible to avoid stopping of the vehicle due to a decrease in the amount of charge of the battery 60 when the vehicle travels in the high-height section, electric power generation in a state in which the efficiency of the engine 10 has deteriorated, and electric power generation in sections which are not planned.

The plan modifier 108 may modify the electric power generation plan to a plan for compensating for electric power corresponding to the decrement $\Delta E$ by increasing the amount of generated electric power per unit time instead of or in addition to increasing an electric power generation time in a section set to an electric power generation section.

Figure 7:
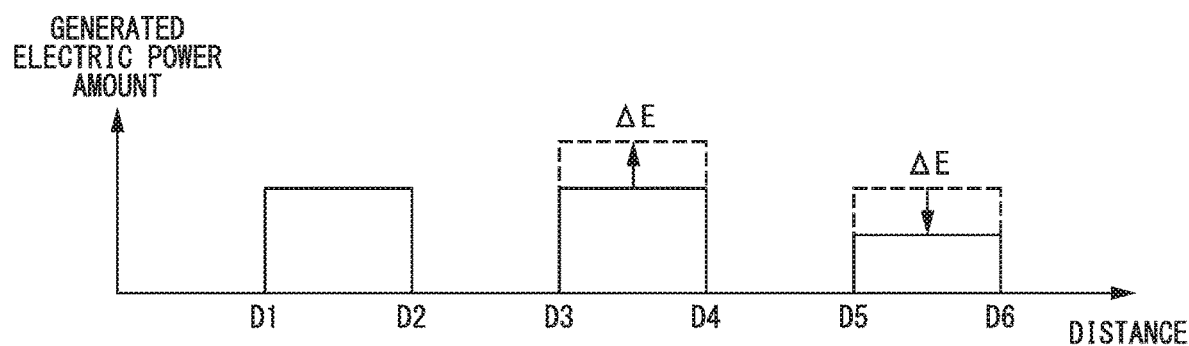
FIG. 7 is a diagram showing an example of an electric power generation plan for compensating for electric power corresponding to a decrement.

FIG. 7 is a diagram showing an example of an electric power generation plan for compensating for electric power corresponding to the decrement $\Delta E$. For example, the plan modifier 108 modifies the electric power generation plan to a plan for increasing the amount of generated electric power by $\Delta E$ at the same electric power generation time in the D3-D4 section (without modifying electric power generation time) in order to compensate for electric power corresponding to the decrement $\Delta E$ of the amount of generated electric power in the D5-D6 section. In this case, the power controller 70 increases the amount of generated electric power of the first motor 12 by enlarging a throttle opening to increase the power of the engine 10 in the D3-D4 section, for example, compared to the amount of generated electric power before the electric power generation plan.

Since the decrement $\Delta E$ of the amount of generated electric power increases as the height of a high-height section increases, as described above, the plan modifier 108 may modify the electric power generation plan to a plan for further increasing the amount of generated electric power in electric power generation sections as the height of the high-height section increases when one or more sections before the high-height section are set to the electric power generation sections.

The plan modifier 108 may modify the electric power generation plan to a plan for compensating for the electric power corresponding to the decrement $\Delta E$ by increasing the amount of generated electric power in each of a plurality of sections set to electric power generation sections.

Figure 8:
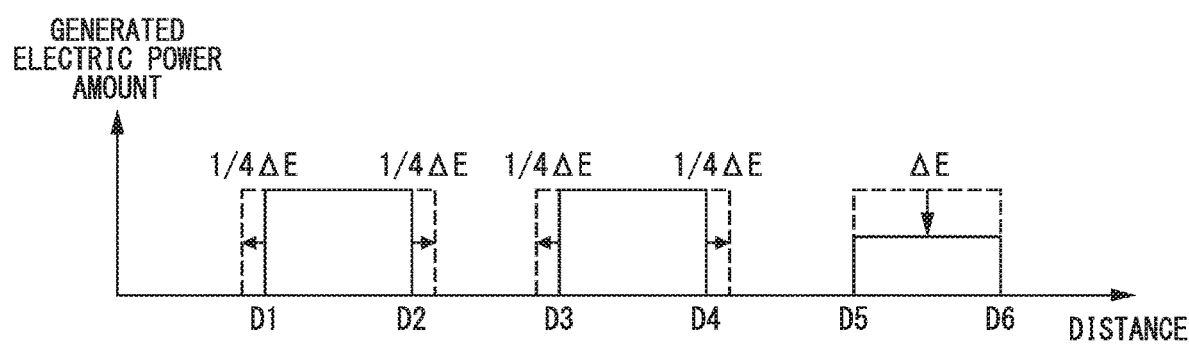
FIG. 8 is a diagram showing another example of the electric power generation plan for compensating for electric power corresponding to a decrement.
Figure 9:
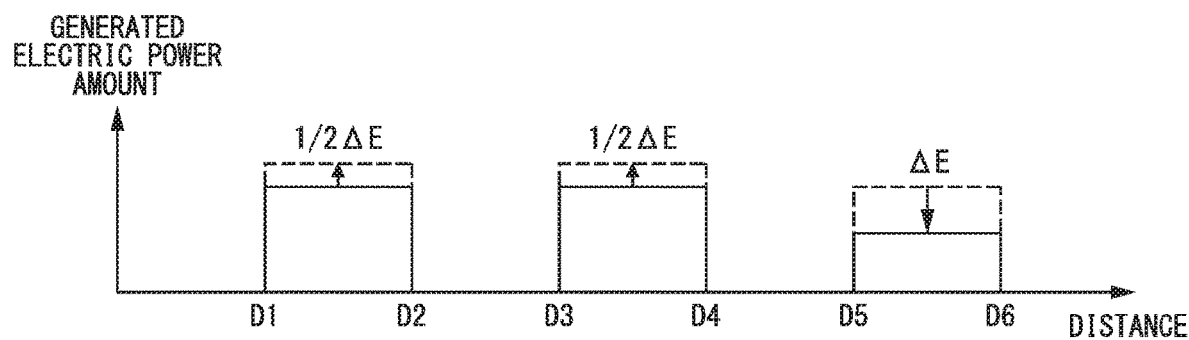
FIG. 9 is a diagram showing another example of the electric power generation plan for compensating for electric power corresponding to a decrement.

FIG. 8 and FIG. 9 are diagrams showing other examples of the electric power generation plan for compensating for the electric power corresponding to the decrement $\Delta E$. For example, the plan modifier 108 modifies the electric power generation plan to a plan for increasing the amount of generated electric power in each of the D1-D2 section and the D3-D4 section in order to compensate for electric power corresponding to the decrement $\Delta E$ of the amount of generated electric power in the D5-D6 section. For example, the plan modifier 108 may modify the electric power generation plan such that the amount of generated electric power equally increases by $\Delta E/2$ in each section.

When a high-height section is set to an electric power generation section, if one or more sections before the high-height section include a section which is not set to an electric power generation section, the plan modifier 108 may modify the section to a section in which the amount of electric power $\Delta E$ expected to decrease in the high-height section is generated.

FIG. 10A to FIG. 10D are diagrams explaining other examples of the method for modifying an electric power generation plan. As shown in FIG. 10A, a speed is assumed to be equal to or higher than the threshold value $V_{Th}$ in a D1-D2 section, a D3-D4 section, a D5-D6 section and a D7-D8 section. In this case, the electric power generation plan generator 104 sets some or all of these four sections to electric power generation sections of the first motor 12 in an electric power generation plan. For example, the electric power generation plan generator 104 preferentially sets sections in which the speed of the vehicle increases during traveling among the four sections which are candidates for electric power generation sections to electric power generation sections. In the illustrated example, the speed of the vehicle during traveling is high in the order of the D3-D4 section, the D1-D2 section, the D7-D8 section and the D5-D6 section. Accordingly, the electric power generation plan generator 104 sets the D3-D4 section to an electric power generation section first, determines whether the amount of generated electric power assumed to be generated in this section has arrived at an electric power generation requested electric power amount, and subsequently sets the D1-D2 section to an electric power generation section when the amount of generated electric power has not arrived at the electric power generation requested electric power amount. Then, the electric power generation plan generator 104 determines whether the sum of the amount of generated electric power in the D3-D4 section and the amount of generated electric power in the D1-D2 section has arrived at the electric power generation requested electric power amount and further sets the next D7-D8 section to an electric power generation section when the sum of the amounts of generated electric power has not arrived at the electric power generation requested electric power amount. In this manner, the electric power generation plan generator 104 sets electric power generation sections until the sum of the amounts of generated electric power in respective sections exceeds the electric power generation requested electric power amount. In the illustrated example, the D5-D6 section is not set to an electric power generation section because the sum of the amounts of generated electric power in the respective sections exceeds the electric power generation requested electric power amount at the time when the D7-D8 section in which the vehicle speed is the third height is set to an electric power generation section.

Meanwhile, the D7-D8 section corresponds to a high-height section having a height equal to or greater than the threshold value $H_{Th}$, as illustrated in FIG. 10B. Accordingly, the amount of generated electric power decreases by $\Delta E$ in the D7-D8 section, which is a high-height section, as shown in FIG. 10C. In such a case, the plan modifier 108 modifies the electric power generation plan such that electric power corresponding to the decrement $\Delta E$ of the amount of generated electric power in the D7-D8 section is generated in the D5-D6 section, which is not set to an electric power generation section, as shown in FIG. 10D. Accordingly, it is possible to predict that the amount of generated electric power of the first motor 12 decreases when the vehicle travels in a high-height section and to generate a larger amount of electric power before the vehicle arrives at the high-height section.

The plan modifier 108 may preferentially set a section in which the speed of the vehicle increases during traveling other than the D7-D8 section, which is a high-height section to an electric power generation section. In this case, when the amount of electric power generated in sections other than the D7-D8 section, which is a high-height section, does not reach the electric power generation requested electric power amount, the plan modifier 108 generates a plan for generating electric power in the excluded high-height section. When a plan for generating electric power in a plurality of high-height sections is generated, the plan modifier 108 may cause electric power to be preferentially generated in a section in which electric power generation efficiency is high or increase the amount of power generated per unit time in a high-height section in which electric power generation efficiency is higher than those in other high-height sections.

Referring back to FIG. 3, subsequently, the command output unit 110 outputs instructions for controlling the engine 10, the first motor 12, the second motor 18, the PCU 30, etc. to the power controller 70 according to the traveling plan and the electric power generation plan (step S110). Accordingly, the process of this flowchart ends.

According to the above-described embodiment, it is possible to predict that the amount of generated electric power of the first motor 12 decreases when the vehicle travels in a high-height section and to generate a larger amount of electric power before the vehicle arrives at the high-height section by including: the engine 10 which outputs power; the first motor 12 which generates electric power using the power output from the engine 10; the battery 60 which accumulates electric power generated by the first motor 12; the second motor 18 which drives the vehicle using the electric power supplied from the first motor 12 or the battery 60; the traveling plan generator 102 which generates a traveling plan in which a traveling route along which the vehicle will travel has been planned; the electric power generation plan generator 104 which generates an electric power generation plan for causing the first motor 12 to generate electric power on the traveling route planned on the traveling plan generated by the traveling plan generator 102; and the plan modifier 108 which modifies the electric power generation plan to a plan for increasing the amount of electric power to be generated by the first motor 12 in one or more sections before a high-height section when electric power generation by the first motor 12 in the high-height section having a height equal to or greater than a threshold value among one or more sections constituting the traveling route has been planned in the electric power generation plan generated by the electric power generation plan generator 104. Consequently, it is possible to avoid stopping of the vehicle due to a decrease in the amount of charge of the battery 60 when the vehicle travels in the high-height section, electric power generation in a state in which the efficiency of the engine 10 has deteriorated, and electric power generation in sections which are not planned, causing the vehicle to continuously travel with stability.

[Hardware Configuration]

Figure 11:
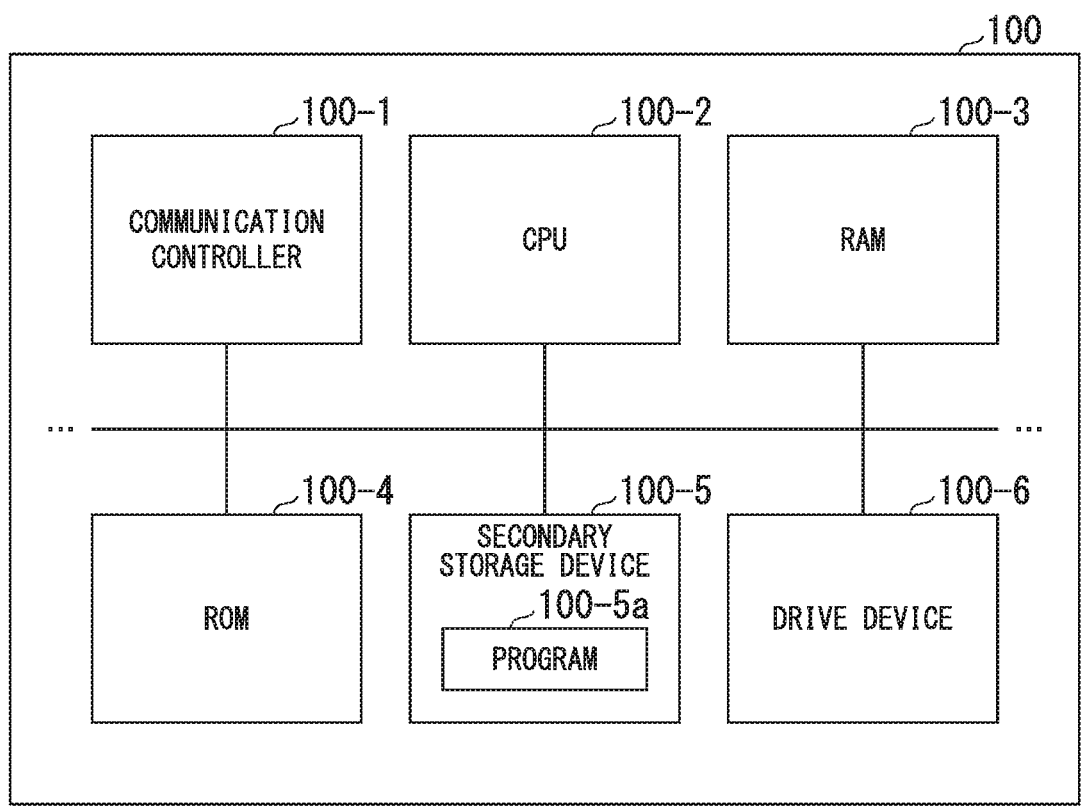
FIG. 11 is a diagram showing an example of a hardware configuration of a controller of an embodiment.

The plan controller 100 of the vehicle system 1 of the above-described embodiment is realized by a hardware configuration as shown in FIG. 11, for example. FIG. 11 is a diagram showing an example of a hardware configuration of the plan controller 100 of an embodiment.

For example, the plan controller 100 has a configuration in which a communication controller 100-1, a CPU 100-2, a RAM 100-3, a ROM 100-4, a secondary storage device 100-5 such as a flash memory or an HDD, and a drive device 100-6 are connected through an internal bus or a dedicated communication line. A portable storage medium such as an optical disk is set in the drive device 100-6. A program 100-5a stored in the secondary storage device 100-5 is developed in the RAM 100-3 by a DMA controller (not shown) and executed by the CPU 100-2 to realize each functional unit of the plan controller 100. Programs referred to by the CPU 100-2 may be stored in a portable storage medium set in the drive device 100-6 or downloaded from other devices through a network NW.

The aforementioned embodiment can be represented as follows.

A vehicle control system, including:

an electric power generator including an engine which outputs power used by a motor, and the motor which generates electric power using the power output by the engine;

a battery which accumulates electric power generated by the electric power generator;

a motor for traveling which is connected to a driving wheel of a vehicle and driven using electric power supplied from the battery to rotate the driving wheel;

a storage which stores a program; and a processor, wherein the processor is configured to, by executing the program:

generate a traveling plan in which a traveling route along which the vehicle will travel has been planned;

generate an electric power generation plan for causing the electric power generator to generate electric power on the traveling route included in the generated traveling plan; and modify the electric power generation plan to a plan for increasing the amount of electric power to be generated by the electric power generator in one or more sections before a predetermined section when electric power generation by the electric power generator in the predetermined section having a height equal to or greater than a threshold value among one or more sections constituting the traveling route has been planned in the generated electric power generation plan.

Although aspects for embodying the present invention have been described above using embodiments, the present invention is not limited to such embodiments and various modifications and substitutions can be made without departing from the spirit or scope of the present invention.

What is claimed is:

1. A vehicle control system, comprising:
an electric power generator comprising an engine that outputs power, and a first motor that generates electric power using the power output by the engine;
a battery that accumulates electric power generated by the electric power generator;
a second motor connected to a driving wheel of a vehicle and driven using the electric power supplied from the battery to rotate the driving wheel;
a traveling plan generator that generates a traveling plan that defines a traveling route along which the vehicle is caused to travel;
an electric power generation plan generator that generates an electric power generation plan for increasing an amount of charge of the battery by a predetermined amount, wherein the electric power generation plan defines a plan for electric power generation by the electric power generator on the traveling route defined by the traveling plan; and
a plan modifier that modifies the electric power generation plan by increasing, compared to an amount of electric power planned before modification of the electric power generation plan, the amount of electric power to be generated by the electric power generator in one or more sections of the traveling route before a predetermined section in response to determining that the predetermined section has a height equal to or greater than a threshold value.

2. The vehicle control system according to claim 1, wherein the plan modifier modifies the electric power generation plan to increase the amount of electric power based on at least the height of the predetermined section.

3. The vehicle control system according to claim 1, wherein the plan modifier modifies the electric power generation plan to increase the amount of electric power in one or more sections before the predetermined section as the height of the predetermined section increases.

4. The vehicle control system according to claim 1, wherein the plan modifier modifies the electric power generation plan to increase an electric power generation time of the electric power generator.

5. The vehicle control system according to claim 1, wherein the plan modifier modifies the electric power generation plan to increase the amount of electric power per unit time of the electric power generator.

6. The vehicle control system according to claim 1, wherein the plan modifier modifies a section of the traveling route before the predetermined section in which electric power generation by the electric power generator has not been planned to a section in which the electric power generator is caused to generate electric power.

7. The vehicle control system according to claim 1, wherein the electric power generation plan generator generates the electric power generation plan such that the amount of electric power generated by the electric power generator increases in a section of the traveling route in which a speed of the vehicle increases.

8. A vehicle control method in which a computer mounted in a vehicle including: an electric power generator comprising an engine that outputs power, and a first motor that generates electric power using the power output by the engine; a battery that accumulates the electric power generated by the electric power generator; and a second motor connected to a driving wheel of a vehicle and driven using electric power supplied from the battery to rotate the driving wheel, the method comprising:
generating a traveling plan that defines a traveling route along which the vehicle is caused to travel,
generating an electric power generation plan for increasing an amount of charge of the battery by a predetermined amount, wherein the electric power generation plan defines electric power generation by the electric power generator along the traveling route defined by the traveling plan, and
modifying the electric power generation plan to increase an amount of electric power to be generated by the electric power generator in one or more sections of the traveling route before a predetermined section compared to the amount of electric power planned before the modifying in response to determining that the predetermined section has a height equal to or greater than a threshold value.

9. A computer-readable non-transitory storage medium storing a program for causing a computer mounted in a vehicle including: an electric power generator including an engine that outputs power, and a first motor that generates electric power using the power output by the engine; a battery that accumulates electric power generated by the electric power generator; and a second motor connected to a driving wheel of a vehicle and driven using electric power supplied from the battery to rotate the driving wheel to perform operations, the operations comprising:
generating a traveling plan in which a traveling route along which the vehicle is caused to travel is defined;
generating an electric power generation plan for increasing an amount of charge of the battery by a predetermined amount in which electric power generation by the electric power generator is planned along the traveling route defined by the traveling plan; and
modifying the electric power generation plan to a modified plan that increases, compared to an amount of electric power planned before the modifying, the amount of electric power to be generated by the electric power generator in one or more sections of the traveling route before a predetermined section in response to determining that the predetermined section has a height equal to or greater than a threshold value.

10. The vehicle control system according to claim 1, wherein the electric power generation plan generator generates the electric power generation plan based on a difference between the amount of charge of the battery and a power consumption amount predicted to be consumed until the vehicle arrives at a destination.

11. The vehicle control system according to claim 1, further comprising an electric power amount deriver that derives a decrement in the amount of electric power generation of the electric power generator planned as the generation plan in each section of the traveling route based on a height of the traveling route,
wherein the plan modifier modifies the electric power generation plan based on the decrement derived by the electric power amount deriver.

* * * * *